Oct. 20, 1970   A. J. CARDILE   3,535,514
POSITIONABLE APERTURE FOR ELECTRON MICROSCOPE
Filed May 24, 1966

INVENTOR.
ANGELO J. CARDILE
BY Edward C. Norton
ATTORNEY

United States Patent Office 3,535,514
Patented Oct. 20, 1970

3,535,514
POSITIONABLE APERTURE FOR ELECTRON MICROSCOPE
Angelo J. Cardile, Haddonfield, N.J., assignor to RCA Corporation, a corporation of Delaware
Filed May 24, 1966, Ser. No. 552,530
Int. Cl. H01j 37/20, 37/26
U.S. Cl. 250—49.5          8 Claims

ABSTRACT OF THE DISCLOSURE

To produce primary and diffraction images of exactly the same portion of a specimen, a small aperture is positioned between the objective lens and the intermediate lens of an electron microscope. The aperture is movable both transversely of the microscope beam, to select electron beams that go through a desired portion of the specimen, and longitudinally of the beam to put the aperture exactly in the primary image plane of the objective lens. Then by change of energization, and therefore of focal length, of the intermediate or the projection lens or both, the diffraction image is caused to appear on the viewing screen of the microscope. Since due to space requirements, the range of longitudinal motion of one aperture may not be great enough, two adjustable apertures having supplemental ranges are provided.

---

Figure 1:
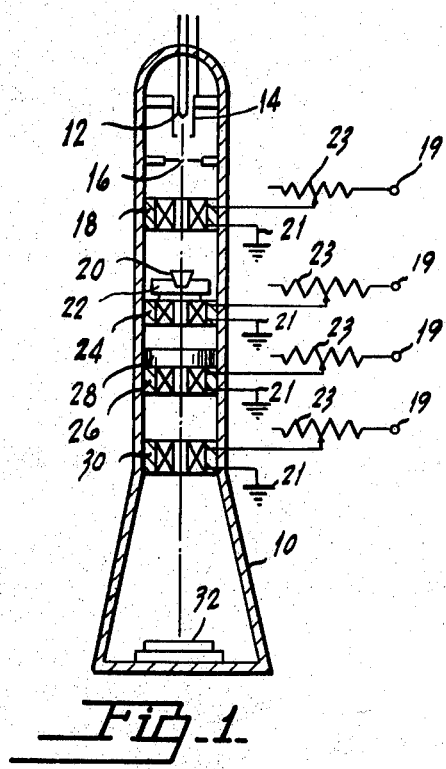

This invention relates to the field of electron microscopy.

It may be important when studying, for example, a crystalline specimen by means of an electron microscope to see the primary or Gaussian image of a part of a specimen and then to see the diffraction image of the same part of the specimen. The two images appear at definite and respective planes of an electron microscope spaced along the path of the electron beam thereof. The plane that is closer to the specimen is called the back focal plane of the objective lens and is the diffraction image plane. The other or objective image plane is the plane of the primary or Gaussian image. It is difficult when using known methods and apparatus involving adjustment of the several lenses and apertures of the electron microscope to obtain a diffraction image which is not degraded by non-contributing electron rays. It is also difficult when using known apparatus and methods to obtain both a primary and a diffraction image of exactly the same portion of the crystalline specimen.

It is an object of this invention to provide an improved structure for an electron microscope by which a diffraction image of a specimen that is not degraded by non-contributing electron rays can be obtained.

It is a further object of this invention to provide an improved electron microscope and method by which both a primary and a diffraction image of the same portion of a specimen can be produced.

It is another object of this invention to provide an aperture element that is so positionable in an electron microscope as to insure that the primary and the diffraction images produced by the microscope are of exactly the same part of a crystalline specimen being studied.

In accordance with this invention, a movable aperture element is positioned between the objective lens and the intermediate lens of an electron microscope. The aperture so provided is made very small so that only the electron beams that pass through a selectable portion of the specimen pass through the aperture. The aperture element has universal motion in that means are provided to move it in any direction transversely to the beam and also means are provided to move the aperture element along the direction of the beam. In viewing a crystalline specimen, the aperture element is moved along the beam until the aperture element is positioned exactly in the objective lens image plane, whereby only focused electrons can pass through the aperture provided by the element and then pass through the intermediate lens and the projection lens to be projected as a focused image onto a viewing screen. By moving the aperture element transversely of the beam, electrons passing through only a chosen part of the specimen can be selected to be projected on the viewing screen. Then, having selected the electrons passing through the chosen part of the specimen and having located the operative element exactly in the objective lens image or primary plane, the energization of the intermediate and the projection lenses of the electron microscope can be adjusted without changing the energization of the objective lens so that the diffraction image of the chosen part of the specimen will appear on the viewing screen.

Figure 3:
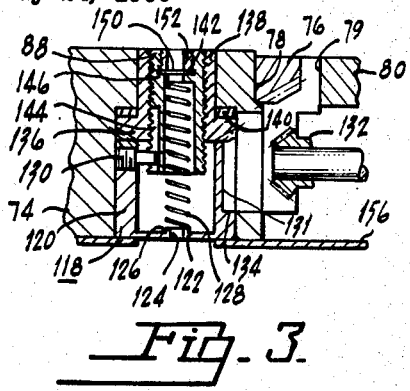
Figure 4:
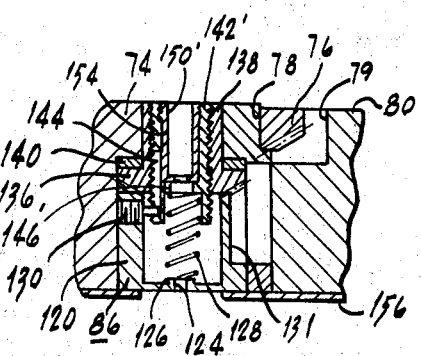
Figure 2:
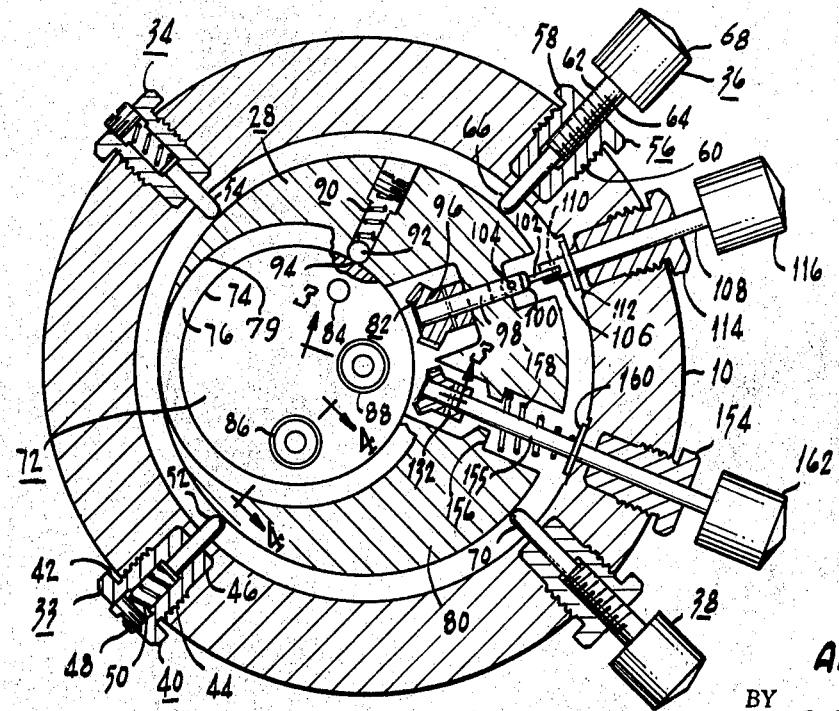

The invention will be more fully understood upon reading the description given in connection with the accompanying drawing in which:

FIG. 1 is a diagrammatic illustration of the vertical section of an electron microscope showing the position therein of the adjustable aperture device of this invention, FIG. 2 is a plan view partially in section and partially broken away of one embodiment of an adjustable aperture device according to this invention, FIG. 3 is a sectional view of the aperture device of FIG. 2 on line 3—3 thereof, and FIG. 4 is a sectional view of the aperture device of FIG. 2 on line 4—4 thereof.

Referring first to FIG. 1, an electron microscope comprises a vacuum tight casing 10. A cathode 12, which is held at a high negative potential with respect to ground by a source (not shown), extends into one end, the upper end as viewed in FIG. 1, of the casing 10. A grid cylinder 14 surrounds the cathode 12. The grid cylinder 14 has a hole therethrough in line with the axes of the casing 10 and of the cathode 12. The grid 14 is held at a high negative potential with respect to ground and at a negative potential with respect to the cathode 12 by conventional means not shown. An anode 16, which is held at ground potential, is positioned beyond the grid 14 from the cathode 12, the anode 16 having a hole therethrough which is in line with the cathode 12 and the hole in the grid 14, whereby a beam of electrons is projected beyond the anode 16 from the cathode 12 and the grid 14. The beam of electrons passes through a condenser lens 18 which causes all the electrons of the beam to move in the same direction and at substantially the same speed so that they can all be focused in the same plane. The electrons then pass through the specimen (not shown) which is held in a specimen holder 20 mounted on a specimen stage 22 which is itself mounted on an objective lens 24. The electrons that pass through the objective lens 24 are focused to produce a primary image in a plane above an intermediate lens 26 and in the space taken up by an adjustable aperture device 28. This primary image is amplified by the intermediate lens 26 and is projected by a projection lens 30 on to a viewing plate 32. Conventional structure for energizing the several lenses is denoted by a terminal 19 to which a current source (not shown) may be connected, and a variable resistor 23 is provided in circuit with the source (not shown), the winding of a lens 18, 24, 26 or 30 and a ground connection 21, to vary the energization, and therefore the focal lengths, of the several lenses individually.

For the intermediate lens 26 and the projection lens 30 to properly perform their function of projecting a magnified primary image on the viewing plate 32, the objective lens 24 is so focused that the primary image produced thereby is in the object of the intermediate lens 26. However, due to changes in the energization of the intermediate lens 26 and of the projection lens 30 when changing the magnification of the microscope, the object plane of the intermediate lens 26 changes in position along the microscope beam. To be sure that a diffraction pattern is produced by the same portion of the specimen as that producing a selected portion of a primary image, an image portion selecting aperture (which is included, as will be explained, in the aperture means 28) must be positioned in the object plane of the intermediate lens 26 and further the primary image produced by the objective lens 24 must also be focused in that same plane. Since changes of energization of the intermediate lens 26 or of the projection lens 30 cause changes in the position of the object plane of the intermediate lens 26 in a direction along the electron beam, the image selecting aperture must be movable along the beam. When the microscope is adjusted for normal as distinct from diffraction microscopy, and the edges of the aperture are sharply shown in the viewing screen 32, then the movable aperture is exactly in the plane of the primary image.

Having positioned the movable aperture in the object plane of the intermediate lens 26, if it is desired to obtain an image of another potrion of the specimen, the aperture may be moved laterally of the beam.

Having adjusted the movable aperture to obtain a primary image of a selected portion of the specimen, then by an adjustment of the energization of the intermediate lens 26 and of the projection lens 30 to change the position of the object plane of the intermediate lens along the beam of the microscope thereby to cause the object plane of the intermediate lens 26 to coincide with the diffraction image plane of the objective lens 24, and without change in the energization of the objective lens 24, a diffraction image of exactly the same portion of the specimen may be projected on the viewing plate 32. The aperture included in the aperture device 28 also performs the function of cutting off electrons that would degrade the diffraction image. The position along the microscope beam of the aperture is not changed, once it has been moved into the plane of the primary image, when the adjustment of the microscope is changed to provide either the primary or the diffraction image on the viewing plate 32. The movable aperture means 28 is described in connection with FIGS. 2–4.

Turning to FIG. 2, the aperture device 28 is shown positioned in the casing 10 of an electron microscope. The aperture device 28 comprises a plate 80 having an eccentrically positioned hole 9 therethrough and having a circular aperture disk 72 rotatably mounted in the hole in the aperture device 28. The aperture disk 72 has an aperture 84 and a plurality of aperture means 86 and 88 therethrough which may be moved from an operative position where the electron beam of the microscope passes therethrough, to an inoperative position, by rotating the disk 72 with respect to the plate 80 as will be more fully explained. Also, means described below are provided for moving the aperture means 86 and 88 in a direction which is parallel to the axis of the disk 72.

The aperture device 28 is displaceable laterally as a whole by the manipulation of positioning elements 33, 34, 36 and 38 to adjust the position of the aperture 84 and the aperture means 86 and 88 laterally with respect to the beam. Since elements 33 and 34 are identical, only one thereof is described in detail. The element 33 comprises a threaded vacuum tight packing gland or plug 40 threaded in a radial direction onto the cylindrical casing 10. The plug 40 comprises an enlarged flange portion 42 shaped to be grasped by a wrench, a smaller threaded cylindrical intermediate portion 44 shaped to be received in a cooperating outer threaded portion of a hole in the casing 10 and a final unthreaded portion 46 shaped to be received in an intermediate unthreaded portion of the hole in the casing 10. A hole extends through the plug 40, the outer portion of the hole in the plug 40 being threaded to receive a threaded set screw 48. The hole through the plug 40 in an inner direction beyond its threaded portion is smaller in diameter and is of the size to receive a compression spring 50 and the enlarged head of a slidable pin 52. The pin 52 extends through an inner portion of the hole in the casing 10 and into the interior of the casing 10. The rounded inner end of the pin 52 is in contact with the device 28. The pin 52 is urged inwardly of the casing in a radial direction by means of the spring 50 and urges the device 28 towards the opposite wall of the casing 10. Similarly, the rounded end of the spring pressed slidable pin 54 of the positioning element 34 is in contact with the device 28 and urge it towards the opposite wall of the casing 10. The positioning elements 33 and 34 are radially positioned at a 90° angle with respect to one another.

The positioning elements 36 and 38 are also similar whereby, only the element 36 will be described in detail. The element 36 comprises a vacuum tight plug or gland 56 having a head 58 shaped to be grasped by a wrench. The plug 56 also includes a cylindrical threaded intermediate portion 60 which is received in the outer internally threaded end of a radially extending hole in the casing 10. The plug 56 also includes a cylindrical inner portion of smaller diameter which is received in an unthreaded portion of the hole in the casing 10. A pin 62 extends through the plug 56 and through a final smaller diameter inner extension of the hole in the casing 10. This pin 62 includes a larger diameter threaded portion 64 which is received in a threaded hole through the outer portion of the plug 56. The pin 62 also includes a smaller diameter inner portion 66 that fits a smaller diameter inner extension of the hole through the plug 56 and that also fits the innermost and smallest diameter portion of the hole through the casing 10. The rounded end of the portion 66 of the pin 62 contacts the device 28. A manually rotatable knob 68 is fixed to the pin 62 for rotation therewith. The spring pressed positioning element 33 and the manually adjustable positioning element 36 are in line, whereby upon rotating the knob 68 in one direction, the pin 62 is screwed into the plug 56 to push the device 28 against the resilient opposition of the spring 50 along a diameter of the casing 10, and by rotation of the knob in the opposite direction, the spring pressed pin 52 pushes the device 28 in the opposite direction along said diameter. Similarly, upon rotation of the knob of the locating element 38, the pin 70 thereof, which is in line with the pin 54 of the locating element 34, causes motion of the aperture device 28 along a second diameter through the locating elements 34 and 38. Since the two diameters are at right angles, by manipulation of the knobs of the locating elements 36 and 38, an aperture (one of 84, 86 and 88) carried by the aperture device 28 can be so moved laterally of the beam so as to select electrons that pass through the portions of the specimen that are to be viewed.

The aperture device 28 rotatably carries the aperture disk 72. The aperture disk 72 includes a central disk portion 74 and a ring bevel gear 76 which is fixed to and surrounds the upper periphery of the disk portion 74, the bevel ring gear 76 fitting into a notch 78 (see FIGS.

3 and 4) in the disk portion 74. The aperture disk 72 fits into the eccentrically positioned hole 79 in the plate 80. A gear means 82, which is more fully described hereinbelow, is provided to mesh with the ring gear 76 to cause it to rotate with respect to the plate 80. Upon rotation of the disk 72, one of the apertures 84 or of the aperture means 86 and 88, which are carried by the disk portion 74, is brought into position to pass the electron beam of the microscope therethrough. A spring pressed ball detent 90 is provided in the plate 80 to hold the disk 72 in a selected one of its several positions at which the ball 92 comprising part of the ball detent 90 enters into one of several spherical notches 94 (only one of which is shown) in the periphery of the disk portion 72. There will be as many notches 94 in the periphery of the disk portion 74 as there are apertures in the disk potrion 74. The aperture 84 is merely a large hole which is used for ordinary electron microscopy. The aperture means 86 and 88 each include apertures which are adjustable along the beam as will be explained, and the apertures comprising part of the aperture means 86 and 88 are quite small compared to the aperture 84.

The gear means 82 for rotating the disk 72 with respect to the aperture device 28 includes a bevel gear 96 which is adapted to mesh with the ring bevel gear 76. The gear 96 is held in a meshed position by a shaft 98 on which the gear 96 is mounted. The shaft 98 fits into a hole in the plate 80 which acts as a bearing for the shaft 98. The outer end of the shaft 98 is bifurcated at 100 and a flat key 102 fits loosely into the bifurcation 100 and is held therein by a pin 104 that extends through the bifurcated end of the shaft 98 and the inner end of the key 102. The outer end of the key 102 is formed into a flat plate at right angles to the portion thereof that extends into the bifurcation 100. The outer end of the key 102 fits loosely into the bifurcation 106 comprising the inner end of another shaft 108, and the outer end of the key 102 is held in this bifurcation by a pin 110. The shaft 108 has a washer 112 surrounding it and in contact with a flattened portion of the inner wall of the casing 10. The shaft 108 also extends through a hole in a vacuum tight plug or gland 114 which is screwed into a hole in the casing 10. The plug 114 has an outer threaded portion threaded into a threaded portion of a hole in the casing 10 and a smaller diameter unthreaded inner portion fitting into a smaller intermediate unthreaded portion of the hole in the casing 10. A knob 116 is fixed to the outer end of the shaft 108. Since the electron beam of the electron microscope is positioned substantially centrally of the casing 10, by turning the knob 116, the gear 96 will be rotated to rotate the disk 72 about its center to present the aperture 84 or either of the aperture means 86 or 88 to the electron beam. The key 102 and its loose connections to the shafts 98 and 108 provide the necessary universal motion between these shafts to permit rotation of the disk 72 by the knob 116 in any lateral position of the device 28 resulting from rotation of the locating pins 36 and 38.

The position of the apertures comprising parts of the aperture means 86 and 88 may be raised or lowered. The means for raising or lowering these apertures will be described in connection with FIGS. 2, 3 and 4. The aperture means 88 (FIG. 3) comprises a cylindrical insert 118 which is inserted into a hole in the disk portion 74. The lower portion of the insert 118 as viewed in FIG. 3, comprises a hollow cylinder 120 which is open at the top, there being a closure plate 122 across the bottom end of the cylinder. The closure plate 122 has a centrally positioned hole 124 therethrough large enough to pass all of the electron beam of the microscope that is not cut off by the aperture means 88. An upstanding flange 126 surrounds the hole 124 for the purpose of positioning a compression spring 128. The end of a rotation preventing pin 130 extends radially into the cylinder 120, the pin 130 being held in its position by the engagement of a threaded portion thereof in a threaded hole in the cylinder 120. The right portion of the cylinder 120 is cut away at 131 to provide clearance for the bevel gear 132 as will be explained. A hole is provided in the periphery of the disk member 74 in line with the cut away portion 131 also to provide clearance for the gear 132. The insert 118 provides further a bevel gear 136 mounted concentrically with and above the cylinder 120. The outer diameter of the gear 136 and of the cylinder 120 are equal. The bevel gear has a large theaded hole therethrough and an internally threaded sleeve 138 is fixed to and extends from the top of the gear 136. The outer diameter of the sleeve 138 is smaller than the outside diameter of the cylinder 120 and fits a smaller diameter portion of the hole in the disk member 74. The threaded inner diameters of the gear 136 and of the sleeve 138 are equal and the threads thereon are continuous. A washer-shaped bearing member 140 is provided above the gear 136 and between the gear 136 and the wall connecting the two diameter portions of the hole through the disk member 74. The threads on an outside threaded sleeve 142 mesh with the threads on the inside of the sleeve 138 and the gear 136. A longitudinal slot 144 is provided in the external surface of the sleeve 142 to receive the end of the pin 130. A hole extends through the sleeve 142, the lower portion of the hole being large enough to receive the spring 128. A plate 146 comprising part of the sleeve 142 and having a hole therethrough provides a seat for the upper end of the spring 128. A threaded cylinder pocket is formed in the top of the sleeve 142 to provide a seat for an aperture element 150 having a small aperture therethrough, and a hollow cylindrical screw 152 is provided to hold the aperture element 150 on its seat. Due to its position in the hole in the aperture disk 74, the bevel gear 136 cannot move axially. Due to cooperation of the pin 130 with the slot 144 in the sleeve 142, the sleeve 142 cannot turn. Therefore, when the bevel gear 136 is turned by the bevel gear 132 as will be explained the sleeve 142 must move up or down, carrying the aperture element 150 with it. The spring 128 takes up any backlash that may be present between the threads on the sleeve 142 and the threads on the inner periphery of the sleeve 138 and the gear 136. A thin plate 156, having holes therethrough for the passage of the electron beams passing through the several apertures, may be fixed to the bottom of the aperture device 28 to prevent the elements of the aperture means 86 and 88 from being displaced.

Due to the necessity for mechanical clearance, the vertical range of motion of the aperture in the aperture means 88 shown in FIG. 3 may be insufficiently great to bring its aperture into the primary focal plane. Therefore, a second vertically adjustable aperture means 86 whose range of vertical adjustment is supplemental to that of the aperture included in the aperture means 88 is provided. This aperture means 86 is shown in FIG. 4. The two aperture means 86 and 88 are similar in many respects whereby similar elements which operate similarly are given the same reference numbers in FIGS. 3 and 4. The aperture means 86 shown in FIG. 4 differs from the aperture means 88 shown in FIG. 3 in that the shoulder 146' for receiving the aperture element in the inner sleeve 142' in FIG. 4 is near the lower end of the inner sleeve 142', and in that the aperture element 150' includes a cylinder 154 which is threaded at its top into the sleeve 142'. The plate closing the bottom of the hole through the cylinder 154 has a small aperture therethrough. In FIG. 4, when the aperture is at its maximum height, it is a little higher than the aperture of FIG. 3 when it is at its minimum height. Therefore, by using two aperture means such as that of FIGS. 3 and 4 in the disk 74, the vertical range of adjustment of the apertures is almost doubled.

Means are provided to turn the bevel gear 136. This means includes the gear 132 (FIG. 2) and a shaft 155 on which it is mounted. The shaft 155 extends through a vacuum tight plug or gland 154 which may be identical with the plug 114 and which is mounted in the casing 10 in an identical manner. The shaft 155 extends through a radially extending hole in the plate 80, this hole being so shaped as to clear the gear 132 and the shaft 155 in all possible positions of the aperture device 28. The hole through the plate 80 is also so shaped as to form a shoulder 156 for a conical compression spring 158 that surrounds the shaft 155. The small diameter end of the spring 158 bears on a washer 160 that is fixed to the shaft 155, the inside of the casing 10 being flattened to receive the washer 160. The spring 158 tends to hold the gear 132 out of contact with the disk device 72. However, when it is desired to adjust the height of the apertures included in aperture means 86 and 88, the knob 162 on the end of the shaft 155 is pressed inwardly until the gear 132 meshes with a gear 136 and then by turning the knob 162, the aperture included in the aperture elements 150 or 150′ may be raised or lowered. The small amount of misalignment between the gears 136 and 132 due to the above-mentioned adjustment of position of the device 28 will not prevent this adjustment in height.

In operating the described telescope, for ordinary microscopy, the knob 116 is turned until the aperture 84 surrounds the electron beam of the microscope. To provide a primary image and a diffraction image, which is not degraded by non-contributing electron rays, of the same portion of the specimen, first the knob 116 is turned until the electron beam passes through the aperture comprising part of the aperture means 86 or the aperture means 88. Then the knob 162 is pushed in and turned until the edges of the aperture comprising part of the aperture means show up in a focused manner on the viewing screen 32. If such an adjustment is not possible, then the knob 116 is rotated to bring the other one of the aperture means 86 or 88 into operative position and the knob 162 is pushed in to move the aperture comprising part of this other aperture means until the edges of the aperture show up in a focused manner. When so adjusted, an aperture is in the primary image plane of the objective lens 24. Then, by manipulation of the knobs 68 and 38, a primary image of a selected portion of the specimen may be provided on the screen 32. Then, by adjustment of the current flow through the intermediate lens 26 or the projection lens 30 to move the object plan of the intermediate lens into the diffraction image plane of the object lens, and without changing the energization of the objective lens 24, the diffraction image of exactly the same portion of the object may be projected on the screen. Of course, the primary image may be brought back to the screen by re-adjusting the energization of the intermediate lens 26 or the projection lens 30, again without changing the energization of the objective lens.

While a particular embodiment of this invention has been described, it will be understood that modifications thereof will suggest themselves to those skilled in the art. The present embodiment is therefore to be considered as illustrative and not in a limiting sense.

What is claimed is:

1. In combination, an electron microscope having an objective lens and an intermediate lens,
    an aperture element positioned between said objective lens and said intermediate lens, and
    means for moving said aperture element back and forth in a direction between said two lenses, and
    a casing surrounding said lens and aperture elements,
    said means for moving said aperture element in a direction between said lenses extending through said casing.

2. The invention as described in claim 1 in which means is provided for moving said aperture element in a direction perpendicular to the direction between said lenses,
    said means for moving said aperture element in a direction perpendicular to the direction between said two lenses extending through said casing.

3. In combination, an electron microscope having a casing,
    an objective lens and an intermediate lens in and spaced along said casing,
    an aperture device in said casing mounted for movement in a direction transverse to the direction between said lenses and positioned between said two lenses,
    said aperture device comprising a plate having an axis,
    an aperture disk mounted on said plate for rotation about an axis that is eccentric with respect to the axis of said plate,
    an aperture element mounted on said aperture disk for motion in the direction between said lenses with respect to said aperture disk,
    means extending through said casing to move said aperture device in a direction transverse to the direction between said lenses,
    means extending through said casing to rotate said aperture disk with respect to said aperture device, and
    means extending through said casing to move said aperture element in the direction between said lenses.

4. The invention as described in claim 3 in which:
    a plurality of aperture elements are mounted on said disk,
    said aperture elements each being adjustable in position in the direction between said lenses,
    the ranges of adjustment of said aperture elements being different,
    said means for moving said aperture elements in the direction between said lenses operating to move either of said elements.

5. The invention as described in claim 3 in which said means to rotate said aperture disk includes a ring gear affixed to and surrounding said disk and also includes a second gear which meshes with said ring gear,
    said second gear being mounted on a first shaft extending through said plate,
    a second shaft extending through said casing, and a universal joint means joining adjacent ends of said first and second shafts.

6. The invention as described in claim 3 in which said means for moving the aperture element in the direction between said lenses comprises concentric inner and outer sleeves,
    the outer periphery of the inner sleeve being threaded and the inner periphery of the outer sleeve also being threaded, said threads being in mesh along at least a portion of their lengths,
    means for rotating a sleeve with respect to the other whereby said one of said sleeves moves axially with respect to the other, said aperture element being mounted on said movable sleeve.

7. The invention as described in claim 3 in which said means for moving the aperture element in the direction between said lenses comprises concentric inner and outer sleeves, the outer periphery of the inner sleeve being threaded and the inner periphery of the outer sleeve also being threaded, said threads being in mesh along at least a portion of their lengths,
    first gear means fixed to one of said sleeves,
    means for preventing rotation of the other of said sleeves whereby upon rotation of said first gear means said other sleeve moves axially with respect to said one sleeve,
    said aperture element being mounted on said other sleeve,
    a shaft extending through said casing,
    a second gear in mesh with said first gear and mounted on said shaft, and
    means for urging said second gear out of mesh with said first gear.

8. The method of providing a diffraction image of a crystalline specimen by means of an electron microscope having spaced objective. intermediate and projection lenses and having a viewing plate and also having an aperture element between the objective lens and the intermediate lens, said method comprising:

focusing said microscope to provide a primary image of said specimen in a plane in the space between said objective lens and said intermediate lens, moving said aperture to place it in the plane of said primary image, and changing the energization of the intermediate and projection lenses without changing the energization of said objective lens to cause said difffraction image to appear on said viewing plate.

References Cited

UNITED STATES PATENTS

| | | | |
|---|---|---|---|
| 2,220,973 | 11/1940 | Marton | 250—49.5 |
| 2,499,019 | 2/1950 | Dornfeld | 250—49.5 |
| 2,510,349 | 6/1950 | Reisner | 250—49.5 |
| 2,897,366 | 7/1959 | Cochran | 250—49.5 |

WILLIAM F. LINDQUIST, Primary Examiner